Oct. 14, 1930.     K. K. WRIGHT     1,778,654
TRUCK
Filed Aug. 28, 1925
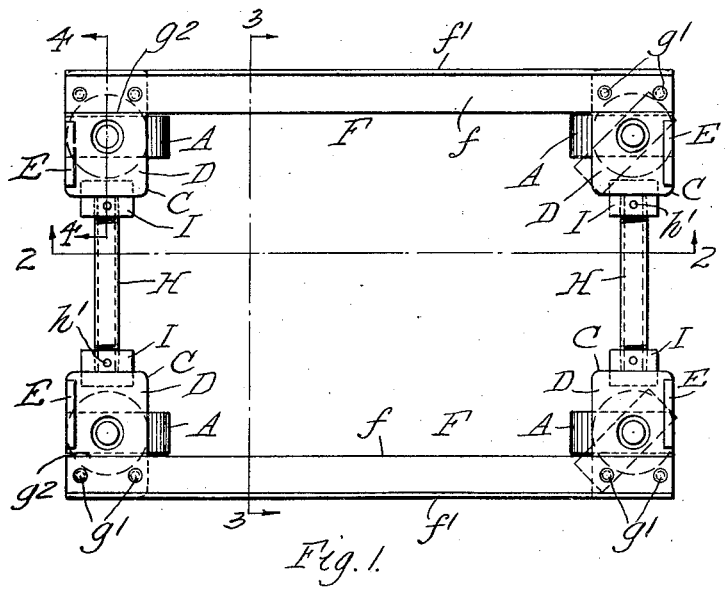
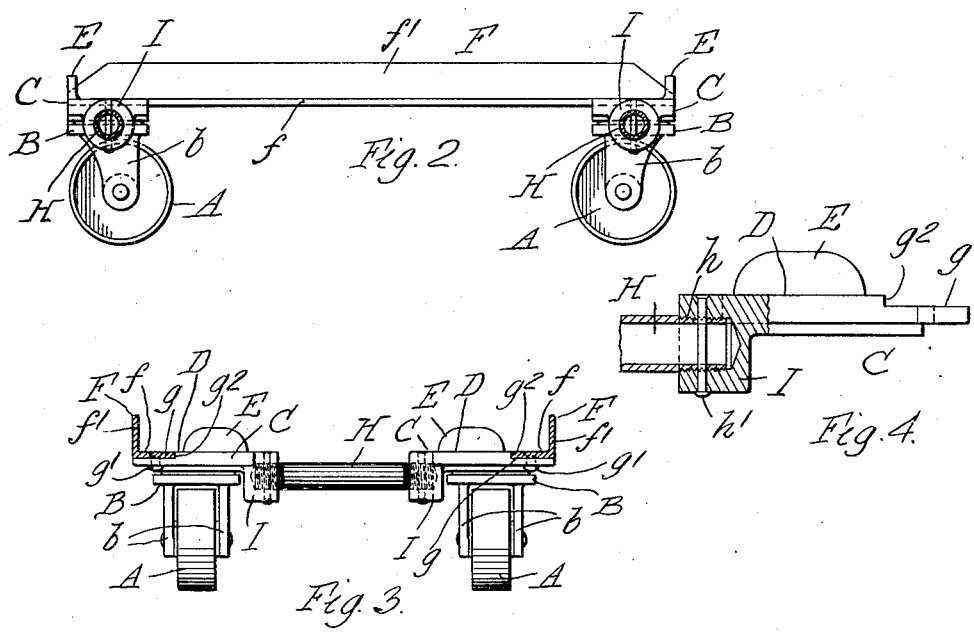
INVENTOR.
Kirk K. Wright.
By Parker & Prochnow
ATTORNEYS.

Patented Oct. 14, 1930

1,778,654

UNITED STATES PATENT OFFICE

KIRK K. WRIGHT, OF BUFFALO, NEW YORK, ASSIGNOR TO R. G. WRIGHT & CO., OF BUFFALO, NEW YORK

TRUCK

Application filed August 28, 1925. Serial No. 53,084.

This invention relates to improvements in trucks of the kind adapted to be used for transporting cases such, for example, as milk bottle cases, and more particularly to trucks of this kind which include a frame member mounted on casters or caster wheels.

The objects of this invention are to provide a truck of this kind in which the frame members are so connected with supporting members of the caster wheels as to produce a simplified construction and a truck of greater strength and which is easier to handle; also to provide a construction in which the top portions or platforms of the caster supporting frames or members themselves are utilized to help support the cases on the truck; also to improve the construction of trucks of this kind in other respects hereinafter specified.

In the accompanying drawings,

Fig. 1 is a top plan view of a truck embodying my invention.

Fig. 2 is a sectional elevation thereof on line 2—2, Fig. 1.

Fig. 3 is a transverse, sectional elevation thereof on line 3—3, Fig. 1.

Fig. 4 is a fragmentary, sectional elevation thereof on line 4—4, Fig. 1.

The casters used in connection with this truck may be of any suitable or desired construction, those shown including caster wheels or rollers A journalled between two downwardly extending arms $b$ of forked bearing brackets B. These bearing brackets are pivoted or swivelled on caster platforms C in any suitable or desired manner.

The truck is preferably so constructed that the caster platforms themselves are adapted to provide supporting surfaces on which the bottoms of the bottle cases may rest, and for this purpose the platforms are provided with substantially flat surfaces D on their upper faces which are adapted to support a part of the load placed on the truck. In order to hold the cases supported on the truck against endwise movement on the truck, the caster platforms C are each provided with an upwardly extending flange or lug E, which is preferably formed integral with the caster top or platform C and which forms a stop or abutment which holds the cases on the truck.

The sides of the truck are formed by means of angle bars F, which are arranged so that one leg or flange $f$ of each angle bar forms a supporting surface for the load and the other flange or leg $f'$ extends upwardly and is adapted to engage the side of a bottle case to prevent the same from moving laterally off of the truck. In order that the bottle cases may be securely supported on the truck, it is desirable that the upper faces of the legs or flanges $f$ of the angle bars be arranged substantially flush with the supporting surfaces D of the caster platforms C and for this purpose each of the caster platforms is provided at a side with a recess or depressed portion $g$ which extends below the level of the face D to such an extent that when the angle bar F is placed upon the depressed portion $g$, the upper face of the horizontal flange or leg $f$ of the angle bar will be substantially in the same horizontal plane as the surface D of the caster platform. The angle bars may be secured to the caster platforms in any suitable or desired manner, for example, by means of rivets $g'$ extending through holes in the angle bars and the caster platforms. By recessing the caster platforms as indicated at $g$, shoulders $g^2$ are formed against which the edges of the horizontal legs or flanges $f$ of the angle bars abut when secured to the caster platforms, and this connection relieves the rivets or other connections $g'$ of a large portion of the strains to which these rivets would be subjected due to twists or stresses resulting from the ordinary use of the truck, so that relative movement between the truck platform C and the angle bars F is prevented, and a very rigid structure is thus produced.

Connections between the opposite sides of the truck are made by means of frame members connecting the inner sides of the caster platforms and which frame members are preferably arranged below the supporting surfaces D of the caster platforms. In the particular construction shown for this purpose these frame members are in the form of tubes H the ends of which are secured in lugs or projections I formed on the sides of the caster platforms C and preferably formed integral therewith. Any suitable connection may be employed between the transverse frame members H and the caster platforms C. In the particular construction shown the ends of the tubular frame members H are threaded and engage correspondingly threaded holes $h$ in the lugs I. Pins $h'$ extending through the lugs I and the ends of the tubes H which are inserted into the holes in the lugs I may also be employed for securing the tubular frame members H in engagement with the caster platforms C, the ends of the pins $h'$ in the construction shown being riveted or swaged over so that the tubular frame members will be securely held in place. If desired the threaded connection between the tubular frame members and the lugs I may be omitted, or other connections may be employed between these two parts. Since the lugs I extend downwardly from the supporting platforms D of the caster tops C, the transverse frame member H will be arranged below any cases or boxes supported on the truck so that these frame members can be readily engaged by hooks commonly used for pulling the truck from place to place, and the cases or boxes on the truck will not interfere in any with the engagement of such hooks with the transverse frame members H.

The caster tops or platforms C may be made of cast iron or other cast material and consequently the lugs or projections E, the depressions $g$ and the lugs I can be readily formed thereon. Standard angle bars can be used for the sides of the truck and standard tubing may be used for the transverse frame members, so that the truck can be very easily and efficiently constructed and at the same time the construction is such that great rigidity and longevity results.

I claim as my invention:—

1. A caster truck including casters swivelled to caster platforms, said platforms having upper surfaces on which a part of the load to be transported may rest, depressed portions on the upper surfaces of said caster platforms at the sides thereof, and angle bars secured in said depressed portions so that the upper face of one flange of each angle bar is substantially flush with the supporting surface of the caster platforms, the other flange of the angle bar extending upwardly to form a side for the truck.

2. A caster truck including casters swivelled to caster platforms, said platforms having upper surfaces on which a part of the load to be transported may rest, depressed portions on the upper surfaces of said caster platforms at the sides thereof, angle bars secured in said depressed portions so that the upper face of one flange of each angle bar is substantially flush with the supporting surface of the caster platforms, the other flange of the angle bar extending upwardly to form a side for the truck, and upwardly extending flanges on said caster platforms which form end walls of said truck to prevent displacement of the load lengthwise of the truck.

3. A caster truck including casters swivelled to caster platforms, said platforms having upper surfaces on which a part of the load to be transported may rest, depressed portions on the upper surfaces of said caster platforms at the sides thereof, angle bars secured in said depressed portions so that the upper face of one flange of each angle bar is substantially flush with the supporting surface of the caster platforms, the other flange of the angle bar extending upwardly to form a side for the truck, said caster platforms having downwardly extending portions on their inner sides, and transverse frame members connecting said downwardly extending portions of said caster platforms.

4. A caster truck including casters swivelled to caster platforms, said platforms having upper surfaces on which a part of the load to be transported may rest, depressed portions on the upper surfaces of said caster platforms at the sides thereof, angle bars secured in said depressed portions so that the upper face of one flange of each angle bar is substantially flush with the supporting surface of the caster platforms, the other flange of the angle bar extending upwardly to form a side for the truck, upwardly extending flanges on said caster platforms which form end walls of said truck to prevent displacement of the load lengthwise of the truck, said caster platforms having downwardly extending lugs at the inner sides thereof, and tubular frame members having their ends secured in said lugs and extending transversely of the truck.

KIRK K. WRIGHT.